United States Patent
Hwang et al.

(10) Patent No.: US 7,836,242 B2
(45) Date of Patent: Nov. 16, 2010

(54) METHOD FOR PAGE RANDOM WRITE AND READ IN BLOCKS OF FLASH MEMORY

(75) Inventors: Bar-Chung Hwang, Tao-Yuan (TW); Chien-Yin Liu, Hsin-Chu (TW)

(73) Assignee: Nuvoton Technology Corporation, Hsinchu (TW)

( * ) Notice: Subject to any disclaimer, the term of this patent is extended or adjusted under 35 U.S.C. 154(b) by 692 days.

(21) Appl. No.: 11/509,663

(22) Filed: Aug. 25, 2006

(65) Prior Publication Data

US 2008/0052444 A1 Feb. 28, 2008

(30) Foreign Application Priority Data

Jan. 26, 2006 (TW) .............................. 95103052 A (51) Int. Cl.
*G06F 12/00* (2006.01)
*G11C 16/04* (2006.01)

(52) U.S. Cl. .................. 711/103; 711/202; 711/205; 711/206; 711/207; 365/185.29; 365/185.33

(58) Field of Classification Search .................. 711/103, 711/161, 100, 202, 205, 206, 207; 365/185.29, 365/185.33, 218

See application file for complete search history.

(56) References Cited

U.S. PATENT DOCUMENTS

| | | | | |
|---|---|---|---|---|
| 5,717,919 | A | * | 2/1998 | Kodavalla et al. ............... 707/8 |
| 5,842,196 | A | * | 11/1998 | Agarwal et al. ................. 707/2 |
| 6,000,006 | A | * | 12/1999 | Bruce et al. .................. 711/103 |
| 6,363,387 | B1 | * | 3/2002 | Ponnekanti et al. ........... 707/10 |
| 6,470,360 | B1 | * | 10/2002 | Vaitheeswaran ............. 707/205 |
| 6,606,626 | B1 | * | 8/2003 | Ponnekanti ..................... 707/8 |
| 6,763,424 | B2 | * | 7/2004 | Conley ........................ 711/103 |
| 2002/0116588 | A1 | * | 8/2002 | Beckert et al. ............... 711/161 |

* cited by examiner

*Primary Examiner*—Kevin L Ellis
*Assistant Examiner*—Mehdi Namazi
(74) *Attorney, Agent, or Firm*—Stout, Uxa, Buyan & Mullins, LLP (57) ABSTRACT

A method for page random write and read in blocks of flash memory is disclosed. The data could be random written in the pages of block. The pages would be arranged when the block was filled with data, so as to prevent from data copied and erased repeatedly. Present invention would reduce the data read/write time and increase the life-span of flash memory.

20 Claims, 7 Drawing Sheets

METHOD FOR PAGE RANDOM WRITE AND READ IN BLOCKS OF FLASH MEMORY

BACKGROUND OF THE INVENTION

1. Field of the Invention

The present invention generally relates to method for writing and reading in flash memory, and more particularly to method for page random write and read in blocks of flash memory.

2. Description of the Prior Art

In general, NAND-type flash memory are popularly adopted in small memory card such as, compact flash (CF), secure digital (SD), multimedia card (MMC), etc. Conventional method for data accessing in flash memory, is in the unit of page to write/read data, and in the unit of block to erase data.

The common storing unit of page in flash memory is 512 bytes, 2K bytes or 4K bytes. Usually, each block in flash memory comprises 16 pages, 32 pages, or more pages. A flash memory, which storing unit of page is 2K bytes, is generally allowed to accessing parts of pages for 2 to 4 times, but repeatedly writing page would lead to damage of the flash memory or data losing. Besides, some NAND-type flash memory, must orderly write data from low page number to high page number, and the same page is only allowed to write data one more time.

However, if some pages in a block have to update data repeatedly, or some card reader don't write data from low page number to high page number orderly, would lead to copy all data from current block to a new block and then erase all data in current block just for updating the data of a page. Therefore, the data accessing time is raised and the life-span of flash memory is reduced.

As the foregoing discussion, conventional method for data accessing in flash memory, usually causes that data accessing time is raised and life-span of flash memory is reduced. Hence, a method could temporarily update the data in specific pages, then arrange all data later, is required, so that the method would avoid repeatedly copying data of whole block.

SUMMARY OF THE INVENTION

In view of the foregoing, it is an object of the present invention to randomly write data to pages in block without following the order of page number. When the block is filled with data, the data would be arranged according to the order of pages, so as to avoid repeatedly copy and erase the contents of block.

It is another object of the present invention to provide a method for page random write and read in blocks of flash memory, so as to reduce the data accessing time and extend the life-span of flash memory.

According to the foregoing objects, the present invention provides a method for page random write and read in blocks of flash memory, comprises the steps of: step (a), checking whether a write pointer is backward or not; step (b), if said write pointer is backward in step (a), clearing all contents of a page table and setting an initial value to said all contents, moreover, marking the block as a random written block; step (c), orderly writing data to random written pages in said random written block, and setting a plurality of data bytes to record the status of page writing; and step (d), checking whether pausing the procedure of data writing or not.

DETAILED DESCRIPTION OF THE INVENTION

In view of the foregoing, the present invention provides a method for page random write and read in blocks of flash memory. When the block is filled with data, the data would be arranged according to the order of pages, so as to avoid repeatedly copy and erase the contents of block. Besides, present invention provides a method could reduce the data accessing time and extend the life-span of flash memory.

Figure 1:
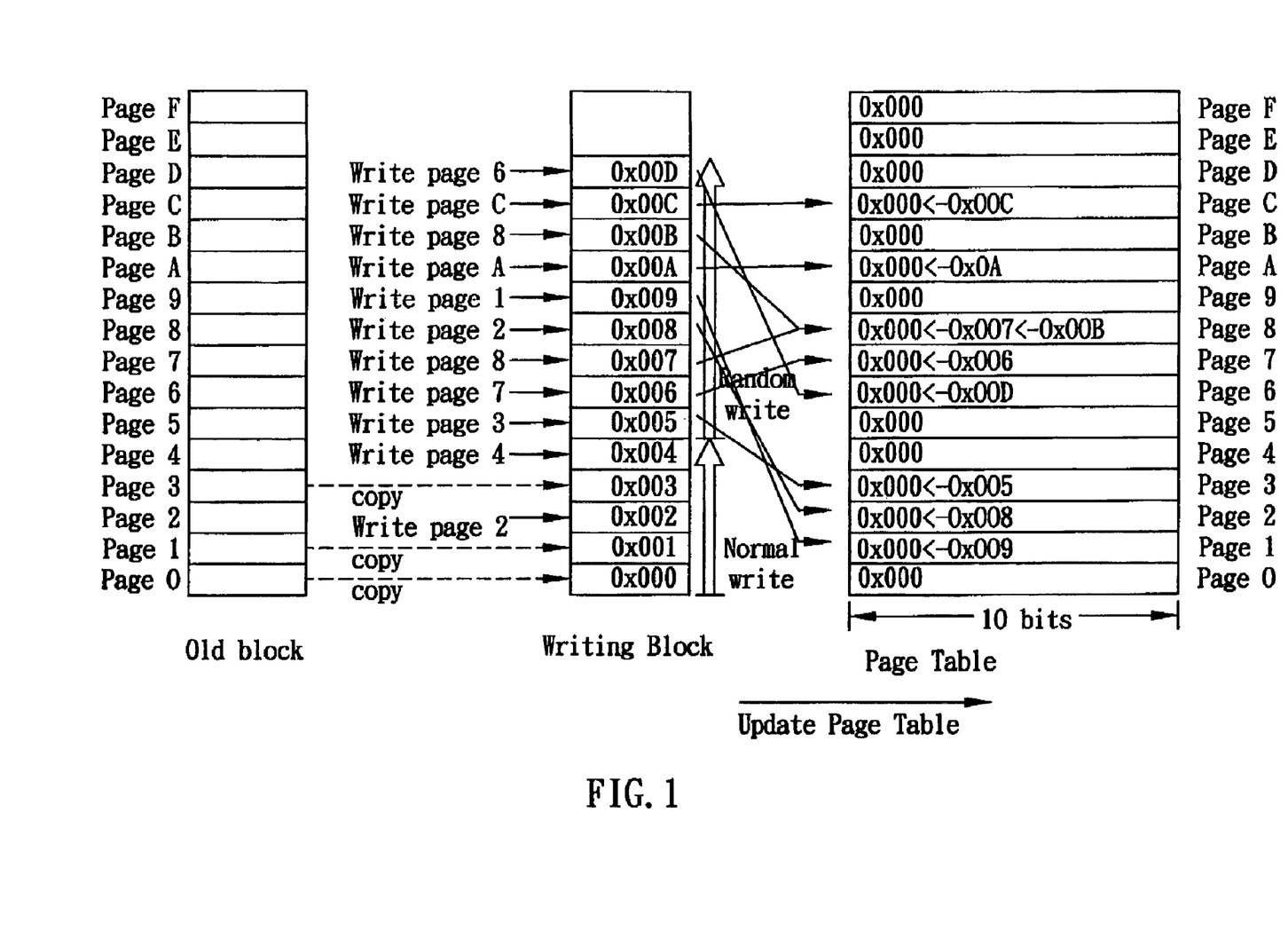
FIG. 1 shows an example, in which data is randomly written to a random written block.

FIG. 1 shows an example, in which data is randomly written to a random written block. As shown in FIG. 1, comprises an old block, a writing block, and a page table. The old block and writing block both comprise 16 pages. In present embodiment, some pages of old block such as, the first page, the second page, the third page, the fourth page, the sixth page, the seventh page, the eighth page, the A page, the C page, all need to update data. Hence, a writing block is used to update and store data according to the order of data update, not according to the logic page number. Thereinafter, an example of recording the store status of data by page table is described.

The size of table page in FIG. 1 is 10 bits. Each content of the table page is set to an initial value, 0x000, at first. During the procedure of data writing from the zero page to the fourth page, the data writing is in the normal writing status, because the data is orderly written to writing block, according to the order of logic page number (lpn), from low page number to high page number. After the fourth page is written, the next page to be written is the third page, so that the writing pointer is backward. For this reason, the memory block status (MBS) code of the physical page number 0x005 is set to random writing status, and is stored to the spare area of the physical page number 0x005. As shown in FIG. 1, the third page represents the logic page number, but the third page is stored in the physical page number 0x005 of the writing block. This information would also be stored in the spare area of the physical page number 0x005 and page table. The purpose of page table is to record the mapping relation between the logic page number and the physical page number. Hence, the content of third page in the page table, is changed from 0x000 to 0x005. According to the foregoing steps, each content of the logic page number in the page table could be stored a corresponding physical page number.

If the writing block is filled with data, or the sequential data is stored to another block, the data of writing block would be arranged by the card controller. The steps of arranging data would be described in following contents of present application.

Figure 2A:
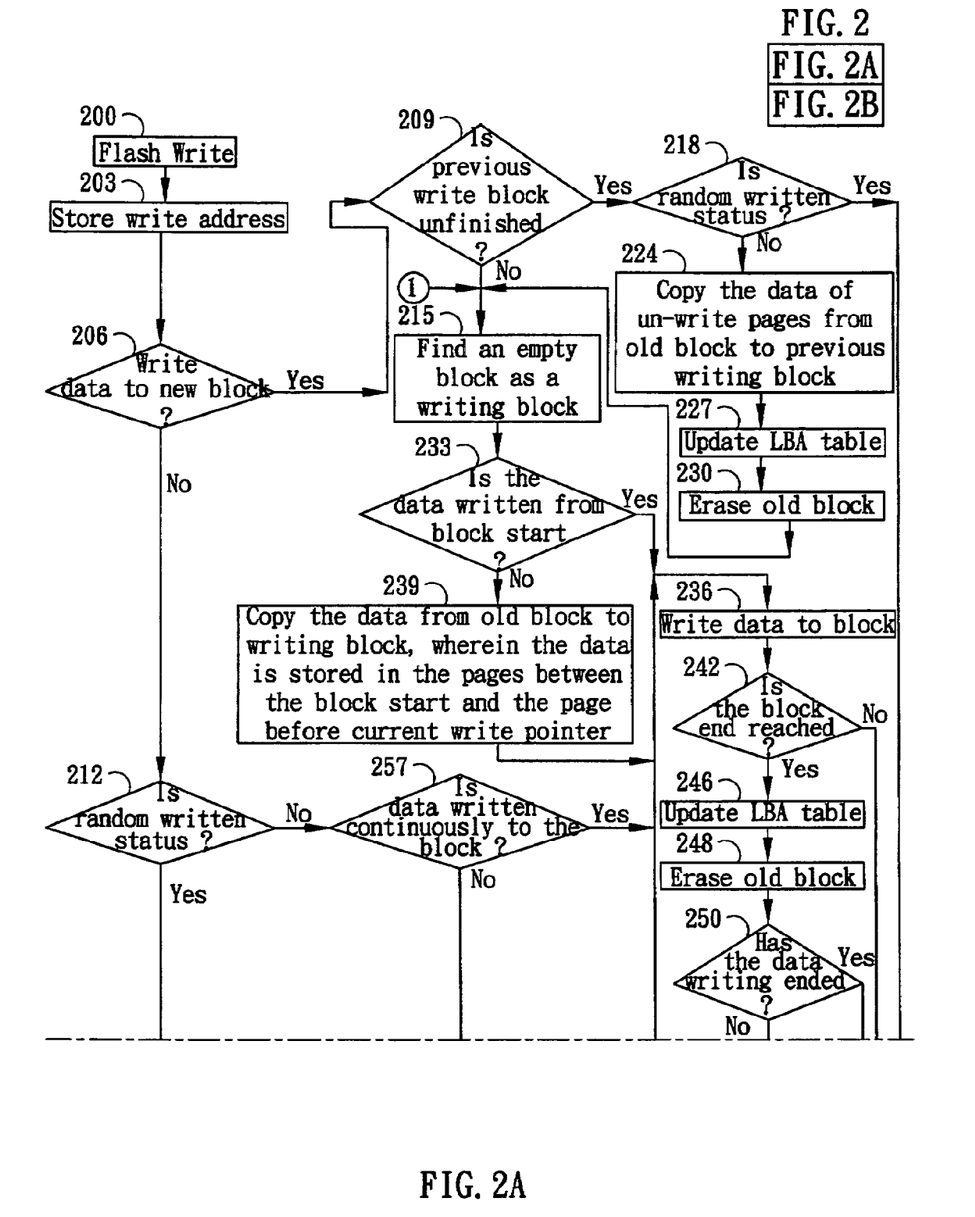
FIG. 2A-2B show a flow-chart of writing procedure of present invention.
Figure 2B:
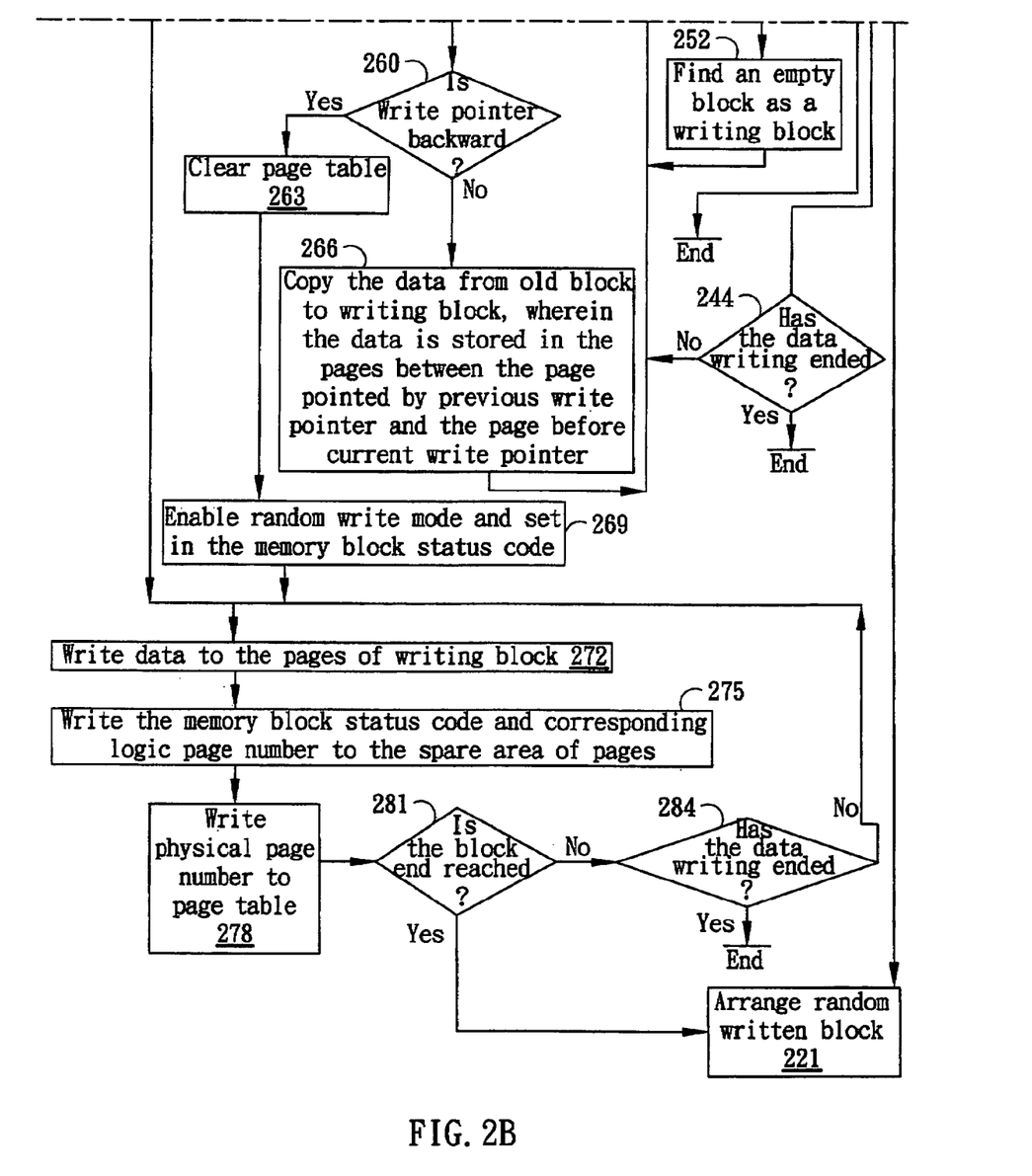

FIG. 2 shows a flow-chart of writing procedure of present invention. At first, a writing procedure is started in flash memory (step 200), and then the write address is stored (step 203). Next, the writing procedure judges whether the data is written to a new block or not (step 206). When the writing procedure judges that the data is written to a new block, the writing procedure then judges whether previous writing block is unfinished or not(step 209). On the contrary, the writing procedure judges whether present block is in random written status or not (step 212).

In the step 209, when the previous writing block is unfinished, the writing procedure judges whether the previous writing block is in random written status or not (step 218). On the contrary, the writing procedure would find an empty block as a writing block (step 215). In the step 218, when the previous writing block is in random written status, the writing procedure would arrange the data of the block which is in the random written status (step 221). On the contrary, the step 224 is performed.

In the step 224, the writing procedure would copy the data of un-write pages from old block to previous writing block, and then the logic block address (LBA) table is updated (step 227). Next, the data of old block is erased (step 230). Thereafter, the writing procedure performs the step 215. In the step 215, the writing procedure would find an empty block as a writing block, and then judges whether the data is written to block start or not (step 233). When the data is written to block start, the writing procedure starts to write data to block (step 236). On the contrary, the writing procedure would copy the data from old block to writing block, wherein the data is stored in the pages between the block start and the page before current write pointer (step 239). Thereafter, the step 236 is performed.

In the step 236, the writing procedure starts to write data to writing block, and then judges whether the block end is reached or not (step 242). When the block end is reached, the step 246 is performed. On the contrary, the step 244 is performed. In the step 246, the logic block address table is updated, and then the data of old block is erased (step 248). Next, the step 250 is performed. In the step 250, the writing procedure judges whether the data writing has ended or not. When the data writing has ended, the present writing procedure is completed. On the contrary, the writing procedure would find an empty block as a writing block (step 252), and then return to the step 236. In the step 244, the writing procedure judges whether the data writing has ended or not. When the data writing has ended, the present writing procedure is completed. On the contrary, the writing procedure would return to the step 236.

In the step 212, the writing procedure judges whether present block is in random written status or not. When present block is in random written status, the data is written to the pages of writing block (step 272). On the contrary, the writing procedure judges whether the data is written continuously to the block or not (step 257). In the step 257, when the data is written continuously to the block, the writing procedure would return to the step 236. Otherwise, the writing procedure checks whether the write pointer is backward or not (step 260). In the step 260, if the write pointer is backward, the step 263 is performed. On the contrary, the writing procedure would copy the data from old block to writing block, wherein the data is stored in the pages between the page pointed by previous write pointer and the page before current write pointer (step 266). Next, the step 236 is performed.

In the step 263, the contents of page table are cleared, and the random write mode is enabled and set in the memory block status code (step 269). Next, the step 272 is performed. In the step 272, the data is written to the pages of writing block. Next, the memory block status code and corresponding logic page number (lpn) is written to the spare area of pages (step 275) and the corresponding physical page number (ppn) is written to the contents of page table (step 278), wherein the contents are corresponding with the logic page number. Then, the writing procedure judges whether the block end is reached or not (step 281). When the block end is reached, the step 221 is performed. On the contrary, the step 284 is performed. In the step 284, the writing procedure judges whether the data writing has ended or not. When the data writing has ended, present writing procedure is completed. On the contrary, the writing procedure would return to the step 272.

Figure 3:
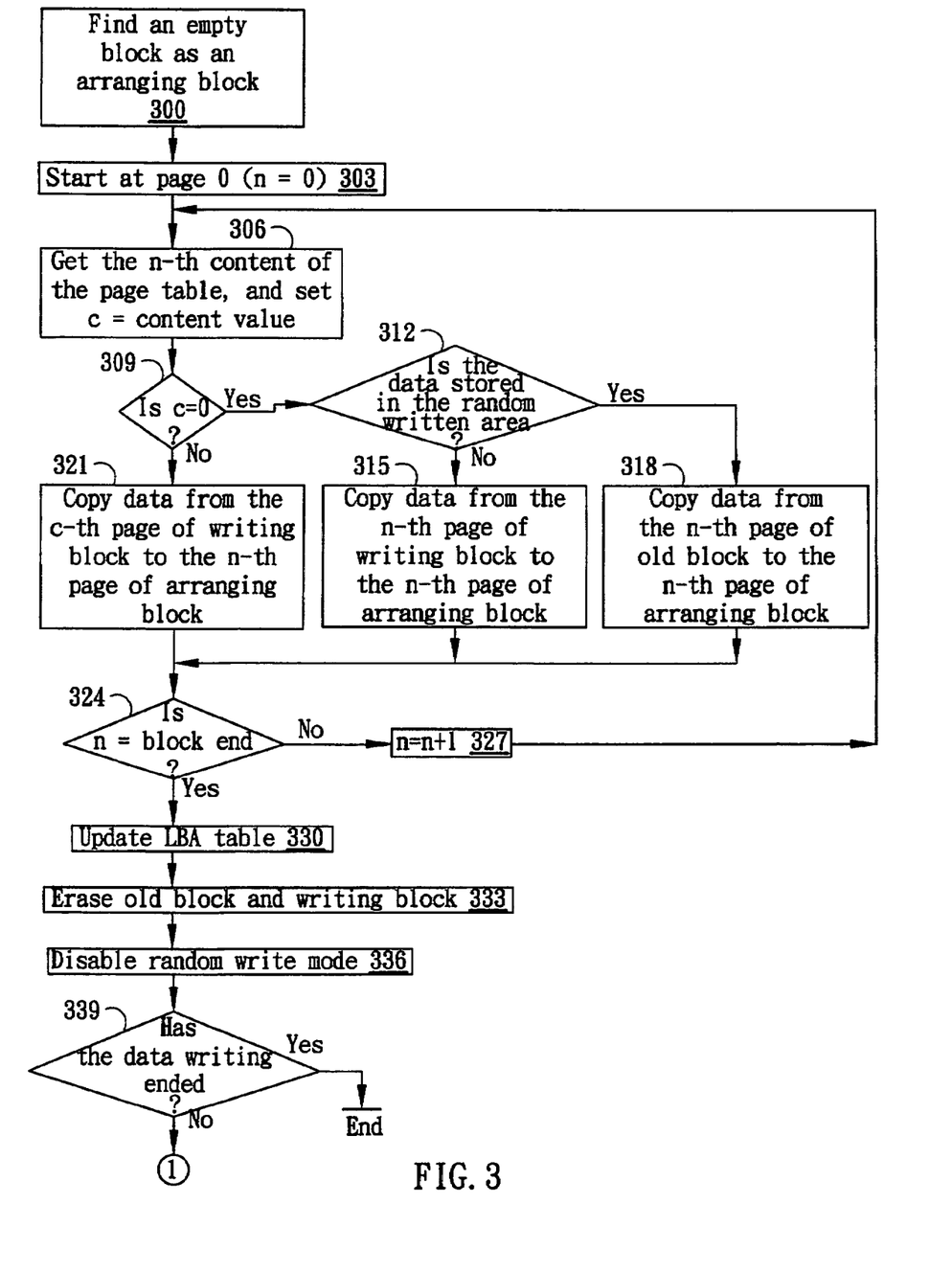
FIG. 3 shows a flow-chart of arranging random written block.

FIG. 3 shows a flow-chart of the step 221 in FIG. 2. When the step 221 is performed, the writing procedure would find an empty block as an arranging block (step 300). Next, the data of block is arranged form the zero page, and a variable n is set to an initial value of 0 (step 303). Then, in the step 306, a variable c is set to an initial value, wherein the initial value is got form the n-th content of the page table. Thereafter, the writing procedure judges whether variable c is equal to 0 or not (step 309). When variable c is equal to 0, the writing procedure judges whether the data is stored in the random written area of block or not (step 312). On the contrary, the writing procedure copies data from the c-th page of writing block to the n-th page of arranging block (step 321).

In the step 312, when the data is stored in the random written area of block, the writing procedure copies data from the n-th page of old block to the n-th page of arranging block (step 318). On the contrary, the writing procedure copies data from the n-th page of writing block to the n-th page of arranging block (step 315). When the step 315, step 318 or step 321 has been performed, and then the step 324 is performed. In the step 324, the writing procedure judges whether the variable n points to block end (the last page of block) or not. When the variable n doesn't point to block end, the variable n would be added 1 (step 327), and then the writing procedure returns to the step 306. On the contrary, the writing procedure would update the logic block address table (step 330), and then erase old block and writing block (step 333), finally, the random write mode is disabled (step 336). Following the step 336, the step 339 is performed. In the step 339, the writing procedure judges whether the data writing has ended or not. When the data writing has ended, present writing procedure is completed. On the contrary, the step 221(FIG. 2) is completed by the writing procedure, next, the writing procedure would return to the step 215 (FIG. 2) to continue to write data.

Figure 4:
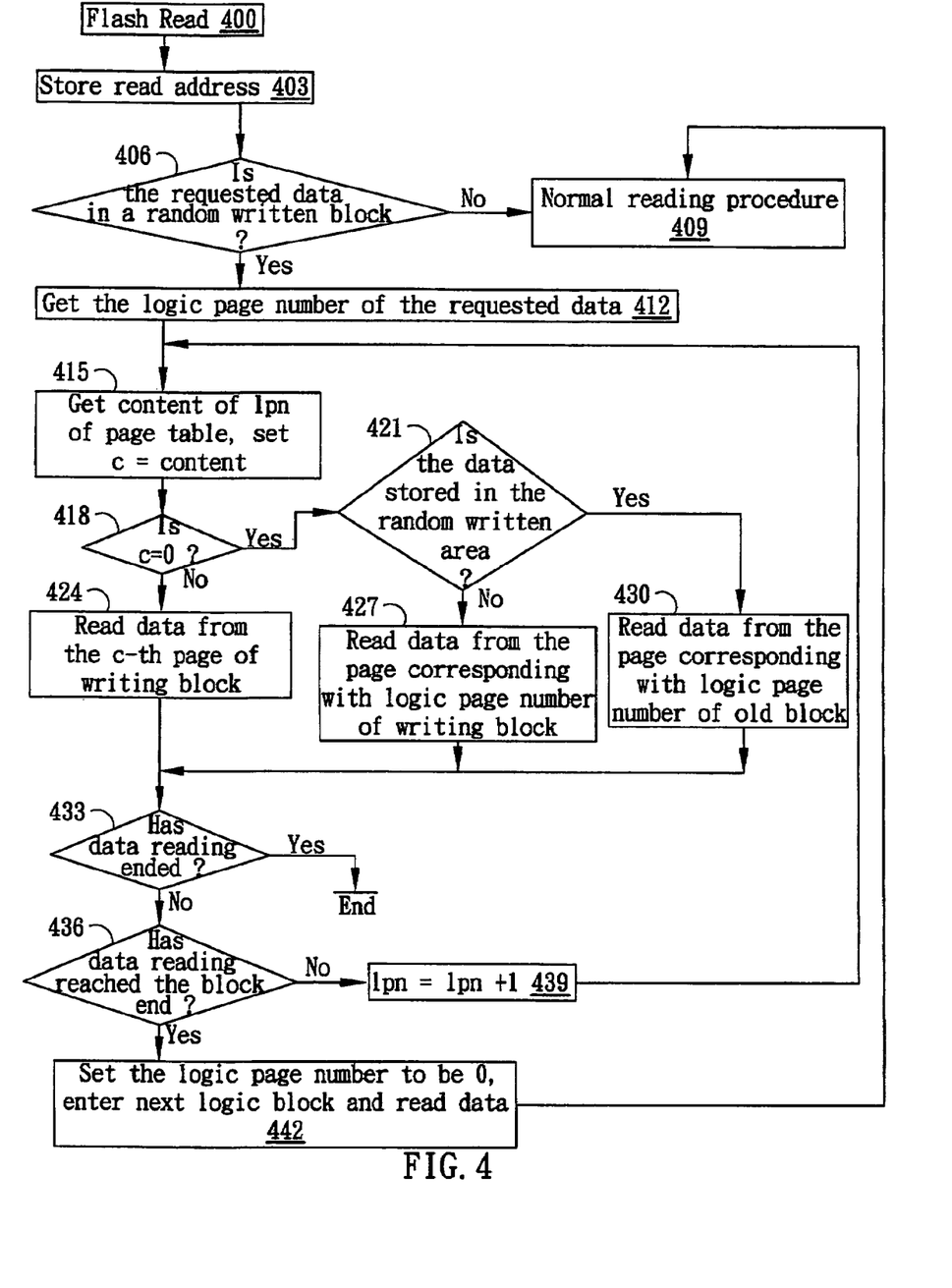
FIG. 4 shows a flow-chart of reading procedure of present invention.

Sometimes, the flash memory is requested for data reading by a card reader, during the writing procedure. Hence, the foregoing writing procedure must be paused, so as to perform a reading procedure to read data for the card reader. FIG. 4 shows a flow-chart of reading procedure of present invention. At first, a reading procedure is started in flash memory (step 400), and then the read address is stored (step 403). Next, the reading procedure judges whether the requested data is in a random written block or not (step 406). When the requested data is not a random written block, a normal reading procedure of prior art is enabled (step 409) to read data. On the contrary, the reading procedure gets the logic page number of the requested data (step 412). Next, in the step 415, a variable c is set to a specific content of page table, wherein the specific content is corresponding with the logic page number. Thereafter, the reading procedure judges whether variable c is equal to 0 or not (step 418). When variable c is equal to 0, the reading procedure judges whether the requested data is stored in the random written area of block or not (step 421). On the contrary, the reading procedure reads data from the c-th page of writing block (step 424).

In the step 421, when the requested data is stored in the random written area of block, the reading procedure reads data from a specific page of old block, wherein the specific page is corresponding with the logic page number got from the step 412 (step 430). On the contrary, the reading procedure reads the requested data from a specific page of writing block, wherein the specific page is corresponding with the logic page number got from the step 412 (step 427).

When the step 424, step 427 or step 430 has been performed, and then the step 433 is performed. In the step 433, the reading procedure judges whether the data reading has ended or not. When the data reading has ended, present reading procedure is completed. On the contrary, the reading procedure judges whether the data reading has reached the block end or not (step 436). When the data reading has not reached the block end, the logic page number would be added 1 (step 439), and then the reading procedure returns to the step 415. When the data reading has reached the block end, the reading procedure would set the logic page number to be 0, enter next logic block and read data (step 442). Finally, the reading procedure returns to step 409.

Figure 5:
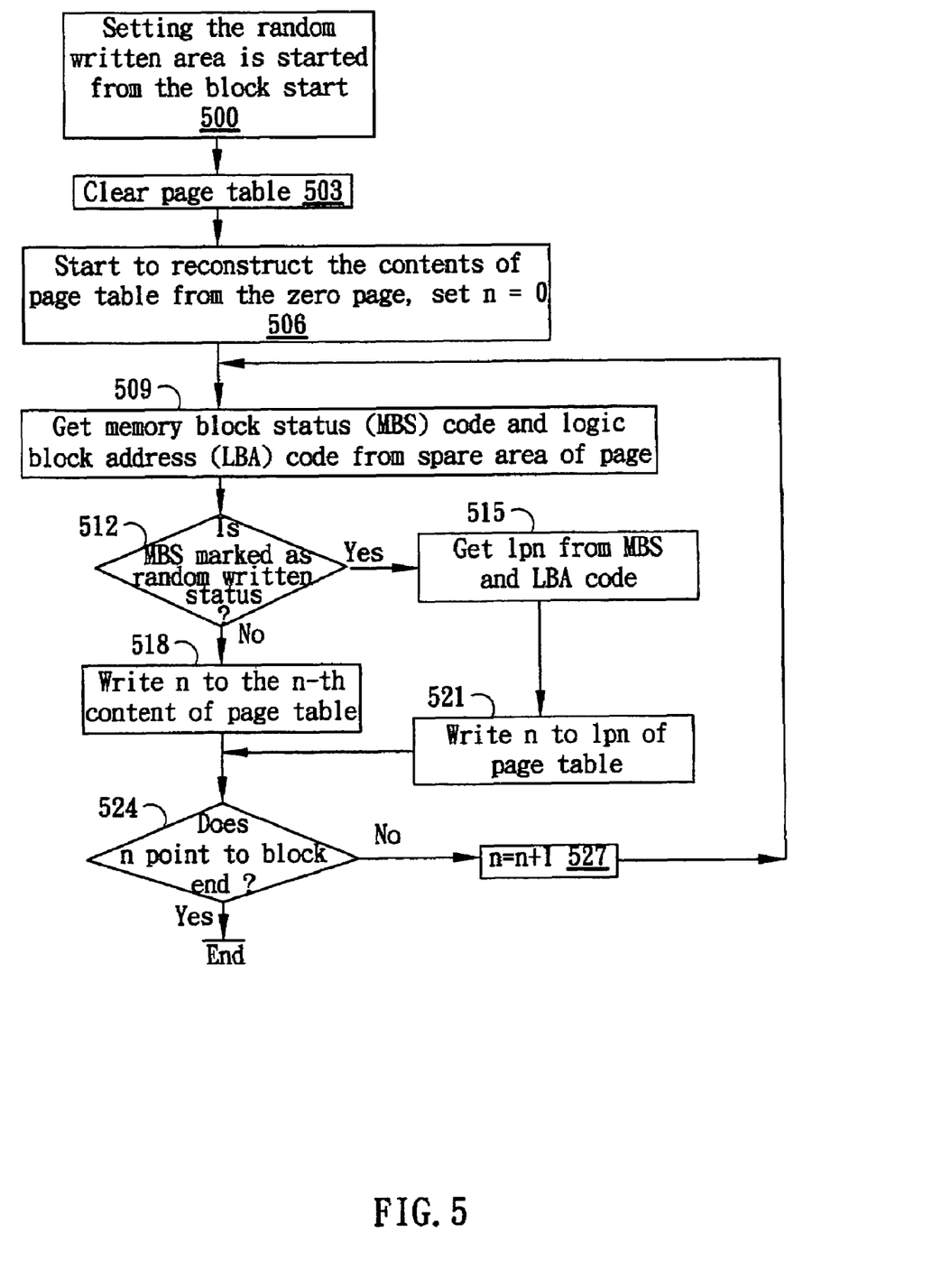
FIG. 5 shows a flow-chart of reconstructing a page table.

In present invention, one object of using page table is to arrange the random written block, according to the contents of page table. But sometimes, the contents of page table would be lost or damaged because of the power failure. A method for reconstructing the contents of page table is also disclosed in present invention. FIG. 5 shows a flow-chart for reconstructing a page table. At first, a reconstructing procedure is started, and setting the random written area is started from the block start (step 500), and then clearing all contents of page table (step 503). Next, starting from the zero page to reconstruct the contents of page table, and setting a variable n to 0 (step 506). Thereafter, the reconstructing procedure gets memory block status code and logic block address code from spare area of page (step 509), and then judges whether the memory block status is marked as random written status or not (step 512).

When the memory block status is marked as random written status, the reconstructing procedure gets the logic page number from the memory block status code and logic block address code (step 515). Next, the reconstructing procedure writes variable n to a specific content of page table, wherein the specific content is corresponding with the logic page number (step 521). When the memory block status in not marked as random written status, the reconstructing procedure would write variable n to the n-th content of page table (step 518). After the step 518 or step 521 is performed, the reconstructing procedure judges whether the variable n points to block end or not (step 524). When the variable n points to block end, the reconstructing procedure is completed. On the contrary, the variable n would be added 1 (step 527), and then the reconstructing procedure returns to the step 509.

Figure 6:
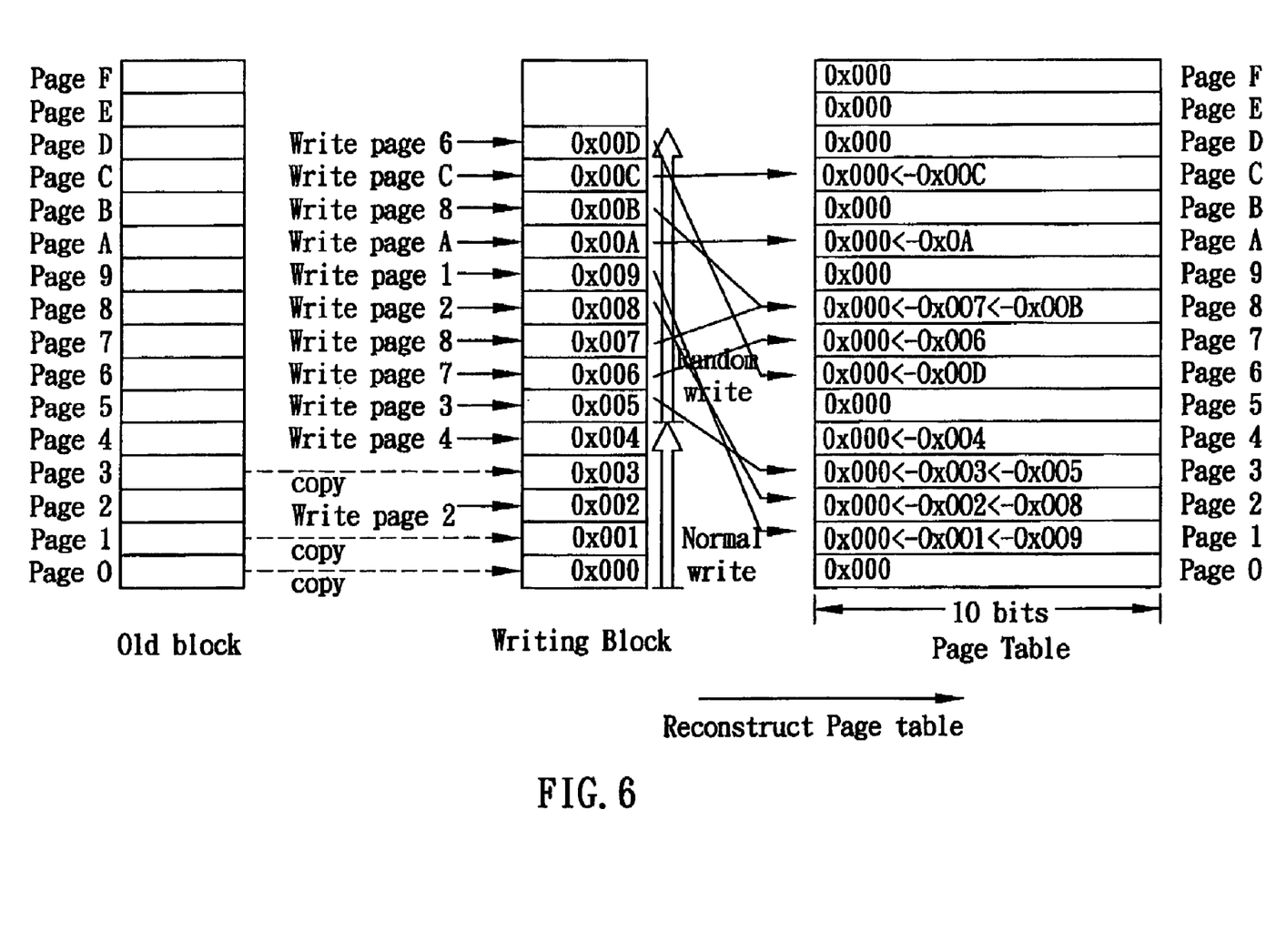
FIG. 6 shows an example, in which the contents of page table are reconstructed.

FIG. 6 shows an example, in which the contents of page table are reconstructed. At first, all contents of the page table are set to an initial value, 0x000. Then, the memory block status form the zero page to the fourth page, is not marked as random written status, so the contents of page table are updated from 0x000 to 0x004 orderly. Afterward, because the memory block status of the pages of writing block, from the fifth page to the F page, is marked as random written status, the reconstructing procedure would get the logic page numbers of these pages from the corresponding memory block status code and logic black address code. Next, the contents of the page table, corresponding with the foregoing logic page numbers, stores the corresponding physical page numbers respectively.

For example, in the content of the third page of page table, the content is set to 0x000 in the first stage. Next, in the second stage, the content is set to 0x003 according to the order of the content, because the memory block status from the zero page to the fourth page is not marked as random written status. Finally, in the third stage, because the third page locates in the page of writing block, in which the physical page number is 0x005, the content of the third page of page table is set to 0x005. According to foregoing steps, all contents of the page table would be reconstructed.

Although specific embodiments have been illustrated and described, it will be appreciated by those skilled in the art that various modifications may be made without departing from the scope of the present invention, which is intended to be limited solely by the appended claims.

What is claimed is:

1. A method for page random write and read in blocks of flash memory, comprising:
   (a) checking whether a write pointer is backward or not;
   (b) if said write pointer is backward in step (a), clearing all contents of a page table and setting an initial value to said all contents, moreover, marking a block to be written as a random written block;
   (c) writing data to random written pages in said random written block, and setting a plurality of data bytes to record the status of page written; and
   (d) checking whether a data writing procedure has been paused or not.

2. The method of claim 1, wherein said data bytes in step (c), comprise a memory block status code and a logic page number.

3. The method of claim 2, wherein said step (c) comprises setting said memory block status code as a random written status.

4. The method of claim 2, wherein said step (c) comprises storing said memory block status code to a spare area of said random written pages.

5. The method of claim 2, wherein said step (c) comprises storing said logic page number to a spare area of said random written pages.

6. The method of claim 1, wherein said step (c) comprises storing physical page numbers of said random written pages to said page table.

7. The method of claim 1, wherein said step (c) comprises performing a data arranging procedure when writing data has reached last page of said random written block.

8. The method of claim 7, wherein said data arranging procedure comprising:
   (e) finding an empty block as an arranging block;
   (f) arranging said arranging block from first page;
   (g) acquiring physical page number corresponding with said first page of page table of said arranging block;
   (h) according to said physical page number, acquiring data from corresponding block, and then storing said data to said first page of said arranging block; and
   (i) updating a logic block address table.

9. The method of claim 1, wherein said step (d) comprises pausing said data writing procedure when a data reading procedure is confirmed to have been performed.

10. The method of claim 9, wherein said data reading procedure comprising:
   (j) checking whether requested data is stored in said random written block;
   (k) acquiring a logic page number of said requested data;
   (l) according to said logic page number, acquiring a physical page number from said page table; and
   (m) acquiring said requested data according to said physical page number.

11. A method for reconstructing a page table in flash memory, comprising:

(a) clearing all contents of a page table of a block and setting an initial value to said all contents;
(b) orderly reconstructing from content of first page of said page table;
(c) acquiring a memory block status code and a logic block address code from a spare area of said first page;
(d) checking whether said memory block status code is set as random written status or not;
(e) if said memory block status code is set as random written status in step (d), acquiring a logic page number from said memory block status code and said logic block address code; and
(f) storing a physical page number corresponding with said first page to said content of said page table, wherein said content corresponds with said logic page number.

12. The method of claim 11, wherein if said memory block status code is not set as random written status in step (d), said physical page number corresponding with said first page, is directly stored to said content of said page table, wherein said content corresponds with said physical page number.

13. The method of claim 11, further comprising:
repeating step (a) to step (f) until physical page number corresponding with each page of said block is stored to corresponding contents of said page table.

14. A method for arranging a random written block in flash memory, comprising:
(a) finding an empty block as an arranging block;
(b) arranging said arranging block from first page;
(c) acquiring physical page number corresponding with said first page of page table of said arranging block;
(d) according to said physical page number, acquiring data from corresponding block, and then storing said data to said first page of said arranging block; and
(e) updating a logic block address table.

15. The method of claim 14, wherein further comprising:
after step (e), erasing an old block and a writing block.

16. The method of claim 15, where said step (d) further comprising:
when said physical page number is not equal to zero, acquiring data from a page of said writing block, corresponding with said physical page number, and then storing said data to first page of said arranging block.

17. The method of claim 15, wherein if said physical page number is equal to zero, said step (d) further comprising:
(f) checking whether said physical page number points to random written area or not.

18. The method of claim 17, wherein if said physical page number points to said random written area in step (f), acquiring data from a page of said old block, corresponding with said physical page number, and then storing said data to first page of said arranging block.

19. The method of claim 17, wherein if said physical page number doesn't point to said random written area in step (f), acquiring data from a page of said writing block, corresponding with said physical page number, and then storing said data to said first page of said arranging block.

20. The method of claim 17, wherein comprising:
repeating step (a) to step (f) until corresponding data is stored to each page of said arranging block.

* * * * *